D. C. Wade,
Soda Water Apparatus.
Nº 43,726.      Patented Aug. 2, 1864.
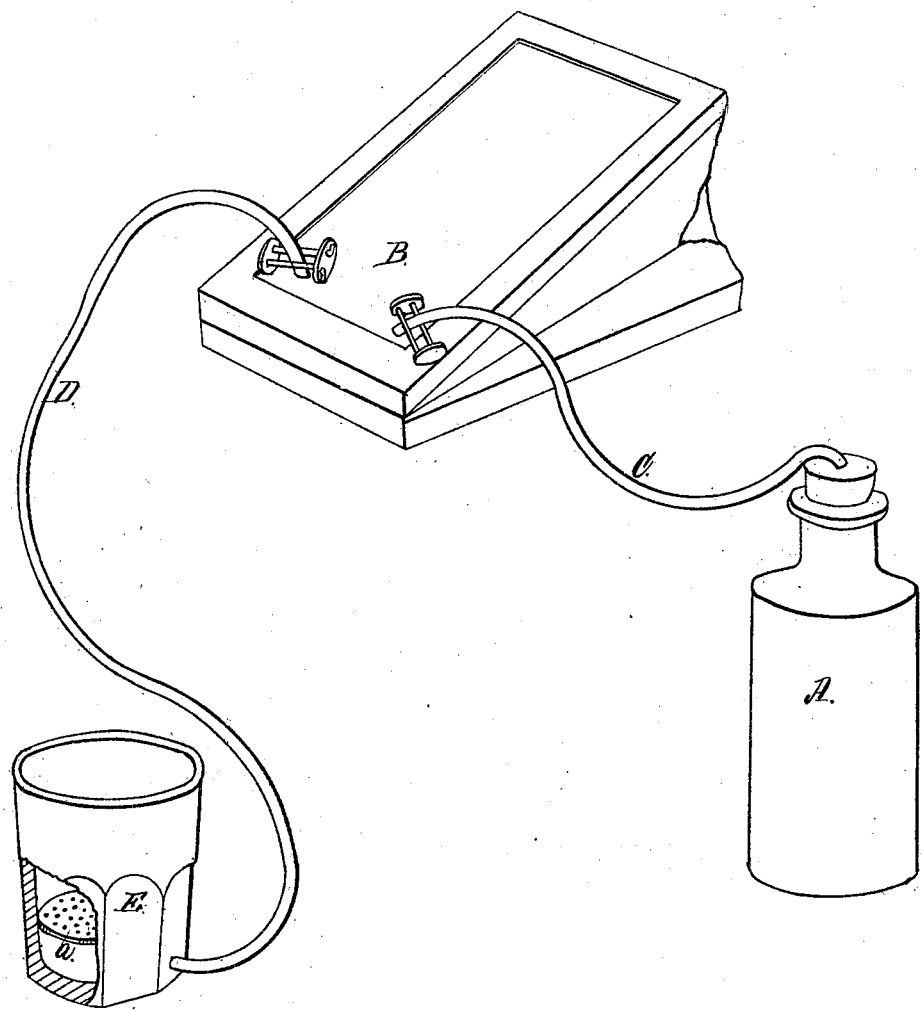
Witnesses:
Wm T. McNamara
J. P. Hall
Inventor
D C Wade
per Mann & Co.
Attorneys

UNITED STATES PATENT OFFICE.

DEWITT C. WADE, OF HOLLEY, MICHIGAN.

IMPROVED SODA-FOUNTAIN.

Specification forming part of Letters Patent No. 43,726, dated August 2, 1864.

*To all whom it may concern:*

Be it known that I, DEWITT C. WADE, M. D., of Holley, in the county of Oakland and State of Michigan, have invented a new and useful Improvement in Soda-Fountains; and I do hereby declare that the following is a full, clear, and exact description thereof, which will enable others skilled in the art to make and use the same, reference being had to the accompanying drawing, which represents a perspective view of my invention.

This invention consists in passing the carbonic-acid gas by means of a flexible tube directly to the tumbler or drinking-glass containing the fluid designed for a drink in such a manner that said fluid is charged with the carbonic acid immediately before it is to be used and the full effect of the acid is obtained, and carbonic-acid water, or other drinks containing such acid, can be produced by a cheap and simple apparatus.

The apparatus which I employ is represented in the drawing; but it must be remarked that I do not wish to confine myself to any particular kind of apparatus, and I have illustrated this apparatus simply in order to be able to demonstrate the practicability of my invention.

A represents the gas-generator, which may be made of glass, earthenware, or any other suitable material strong enough to sustain the pressure to which it may be exposed. This generator connects with the gas-chamber B by means of a flexible tube, C, and said gas-chamber is made of india-rubber or other suitable elastic material; or it may be made in the form of a bellows, so that the same is free to expand when filled with gas and to collapse when empty. By this construction of the gas-chamber the transportation of the whole apparatus is facilitated. When the gas-chamber is empty and collapsed, the whole device can be readily packed up in a small compass. The gas-chamber B connects by a flexible tube, D, with the tumbler or drinking-glass E which contains the water or other liquid to be charged with carbonic-acid gas. In order to disseminate the gas equally throughout the entire mass of fluid contained in the glass or tumbler, said tumbler is provided with a false bottom, *a*, which is perforated with a large number of minute holes, and the pipe D, which conducts the gas to the tumbler, passes in through the side of the same between the two bottoms, as clearly shown in the drawing. The gas in passing up through the minute holes in the false bottom saturates the liquid in the tumbler and a pleasing and healthy drink is obtained.

The gas in the generator is produced in the ordinary manner by bicarbonate of soda and tartaric acid, or by any other suitable combination of materials, such as marble and sulphuric acid, though this latter composition ought not to be used without much precaution, and the gas obtained by its use must be purified before it is admitted to the gas-chamber.

It is obvious that the tubes C D may be provided with suitable stop-cocks to regulate the flow of gas to and from the gas-chamber.

This apparatus is of particular advantage in such cases where it is desirable to prepare carbonic-acid water in a place where it cannot conveniently be procured, and to enable soldiers or sick persons in hospitals, &c., to prepare said water with little trouble and expense.

I claim as new and desire to secure by Letters Patent—

Passing the carbonic-acid gas through a tube, D, directly to the tumbler or drinking-glass containing the fluid designed for a drink, substantially in the manner herein shown and described.

DEWITT C. WADE.

Witnesses:
P. M. THOMAS,
A. J. WHALEN.